United States Patent [19]

Swanberg

[11] Patent Number: 5,588,213
[45] Date of Patent: Dec. 31, 1996

[54] CIRCULAR SAW WITH DUST TRAPPER

[76] Inventor: Alan M. Swanberg, 734 San Carlos Ct., Palo Alto, Calif. 94306

[21] Appl. No.: 400,036

[22] Filed: Mar. 7, 1995

[51] Int. Cl.$^6$ ..................................................... B27B 9/02
[52] U.S. Cl. .............................. 30/124; 30/377; 30/391
[58] Field of Search ........................... 30/124, 125, 391, 30/377; 83/100, 478, 544, 98

[56] References Cited

U.S. PATENT DOCUMENTS

| | | | |
|---|---|---|---|
| 1,713,368 | 5/1929 | Boggio | 30/377 X |
| 1,806,528 | 5/1931 | Fegley et al. | 30/377 X |
| 1,833,785 | 11/1931 | Krieger | 83/98 X |
| 2,237,870 | 4/1941 | Smith | 30/124 |
| 2,781,067 | 2/1957 | Kaley | 83/478 X |
| 2,823,713 | 2/1958 | Goldsmith | 30/391 X |
| 3,468,350 | 9/1969 | Logan | 30/377 X |
| 4,200,417 | 4/1980 | Hager et al. | 83/100 X |
| 4,221,051 | 9/1980 | Glass | 30/377 X |
| 4,230,005 | 10/1980 | Varga | 83/100 |
| 4,241,505 | 12/1980 | Bodycomb | 30/390 |
| 4,253,362 | 3/1981 | Olson | 83/100 |
| 4,255,995 | 3/1981 | Connor | 83/100 |
| 4,361,957 | 12/1982 | Krotz | 30/124 |
| 4,411,067 | 10/1983 | Kirk | 30/124 |
| 4,414,743 | 11/1983 | Pioch | 30/124 |
| 4,672,746 | 6/1987 | Zeilenga | 83/478 X |
| 4,675,999 | 6/1987 | Masanori et al. | 30/124 |
| 5,033,192 | 7/1991 | Franz et al. | 30/124 |
| 5,074,044 | 12/1991 | Duncan et al. | 30/124 |
| 5,084,972 | 2/1992 | Waugh | 30/124 X |
| 5,121,543 | 6/1992 | Onose | 30/124 |
| 5,167,215 | 12/1992 | Harding | 125/13.01 |
| 5,327,649 | 7/1994 | Skinner | 30/124 |
| 5,383,275 | 1/1995 | Hild et al. | 30/475 X |

FOREIGN PATENT DOCUMENTS

| | | | |
|---|---|---|---|
| 785882 | 5/1935 | France | 30/377 |
| 002682314 | 4/1993 | France | 30/377 |

Primary Examiner—Rinaldi I. Rada
Assistant Examiner—Boyer Ashley
Attorney, Agent, or Firm—Robert S. Smith

[57] ABSTRACT

A tool for sawing plaster board being a hood spring loaded hingably attached to the motor of a circular saw such that the blade is completely enclosed in the hood when the saw is not in contact with the surface being cut. An adjustment screw is provided for adjusting the depth of cut. The hood is also equipped with a door with a spout attachable to a source of vacuum for withdrawing kerf.

9 Claims, 2 Drawing Sheets

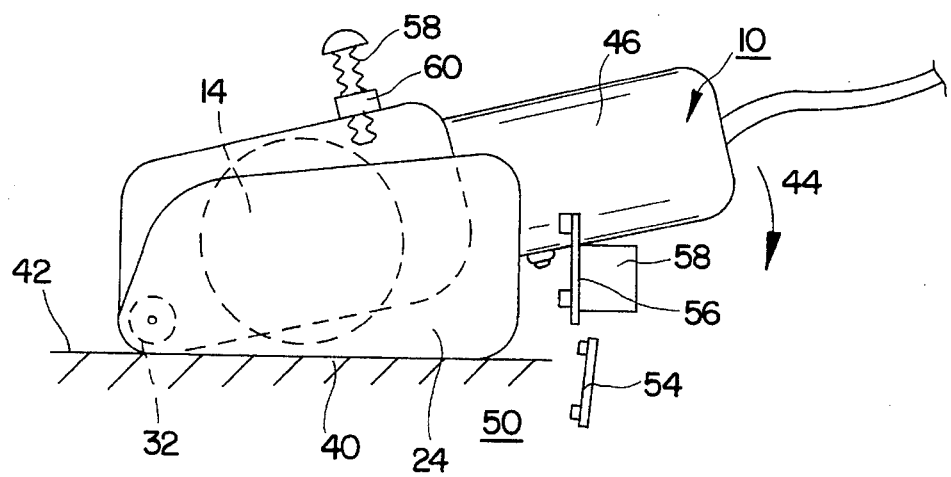
FIG. 2
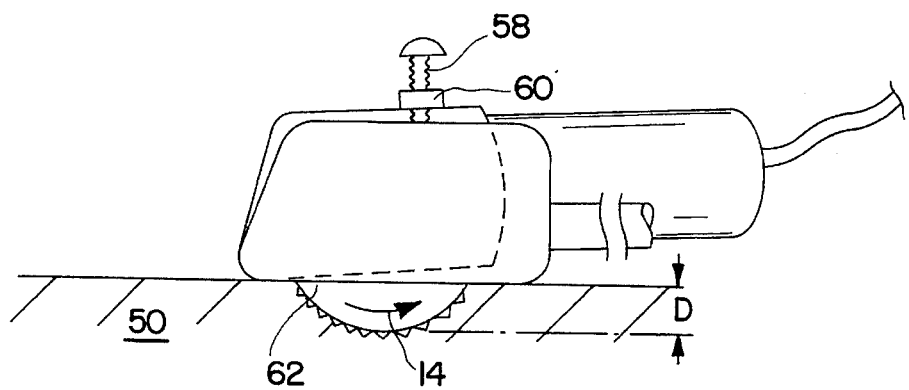
FIG. 3
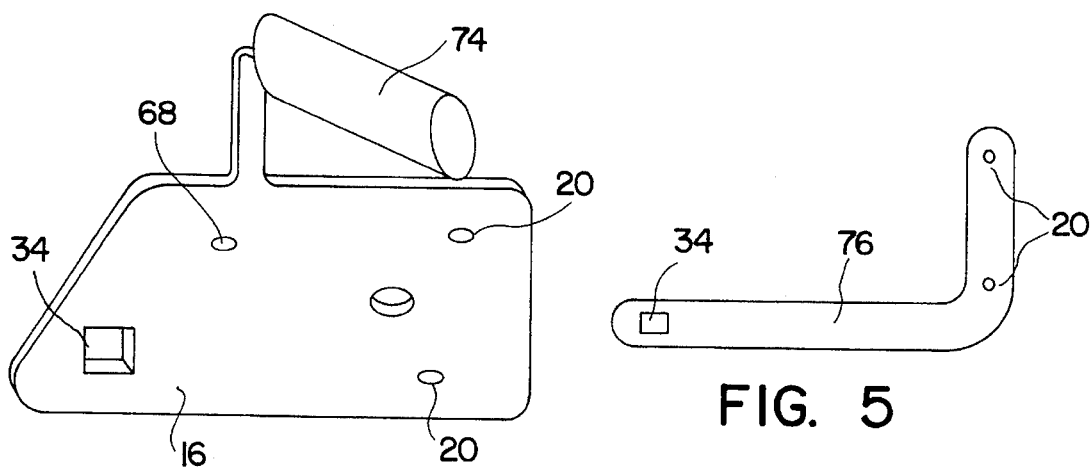
FIG. 4
FIG. 5

CIRCULAR SAW WITH DUST TRAPPER

FIELD OF THE INVENTION

This invention relates to circular power saws and particularly to a circular power saw having a dust collector that is especially effective for use on plaster board.

BACKGROUND AND INFORMATION DISCLOSURE

Installation of plaster board (sometimes referred to as "sheet rock") is a common operation in the construction of buildings. The operation typically involves the necessity to cut the board to an appropriate dimension. In remodelling operations, it is frequently necessary to cut out sections of plaster board from existing walls. The tool that is traditionally used for this operation is a reciprocating saw that inherently generates a large cloud of dust. The cloud of dust is a particular nuisance because of the unhealthy environment that it creates as well as the accumulation of dust. Operations carried out in homes or buildings that are occupied generally require that dust clothes be arranged over items such as expensive furniture or even floors to protect the items from the abrasive nature of the dust.

Numerous patents have appeared which disclose the use of various dust abatement schemes used with circular saws. These disclosures have generally been directed toward saws intended for use on wood such as the popular "Skill Saw™" which is constructed to cut panels such as wood panels which are more resistant to cutting than plaster board.

For example, U.S. Pat. No. 4,230,005 to Varga discloses a circular blade rotating in such a direction that its cutting edge enters into a guard casing at the cutting place, said guard casing having a rim closely adjacent to to the blade near the cutting place and pressed against the material being cut such as to prevent bending of the material.

U.S. Pat. No. 4,241,505 to Bodycomb et al discloses a dust shroud for a circular saw with two housings, one upper housing on the motor side of the panel being cut and a lower housing on the side of the panel opposite the upper housing with a flexible link aligned with the housings and aligned with the blade.

U.S. Pat. No. 4,253,362 to Olson discloses a guard casing enclosing a substantial portion of a circular blade canning a tube having one end connectable to a vacuum source and another end having a slot for accommodating a portion of the blade.

U.S. Pat. No. 4,255,995 to Connor discloses a dust tight housing for a table saw having a a rotatable shaft below the table.

U.S. Pat. No. 4,361,957 to Krotz et al discloses a chamber closely conforming to the cutting member (nibbler, drill bit, etc.) which is connected by a flexible hose to a vacuum chamber.

U.S. Pat. No. 4,411,067 to Kirk discloses a blade housing device for a cast cutting tool which is used to remove a cast from a patient, the housing having a wide periphery through which the a portion of the blade extends. The depth of the cut is preset and extension of the blade from the housing is fixed before the cutting operation. The housing is provided with a port for removal of dust by vacuum.

U.S. Pat. No. 4,414,73 to Pioch et al discloses a housing for a circular saw in which two handles are formed as an integral part of the housing and in which extension of the blade from the housing is preset before the cutting operation is performed.

U.S. Pat. No. 4,675,399 to Masanori et al discloses a circular saw with a sawdust collection system based on the generation of airflow from the rotating blade which transports the sawdust along a guide into a dust box.

U.S. Pat. No. 5,033,192 to Franx discloses a cutting or grinding disk with a hood through which a portion of the blade protrudes. The hood is equipped with a deflection baffle which directs the sawdust into an outlet stub.

U.S. Pat. No. 5,074,044 discloses a guard for a circular saw which has an impeller that rotates with the rotating blade and generates a suction with transport dust from the cutting region to a discharge outlet.

U.S. Pat. No. 5,121,543 to Onose et al discloses a portable circular saw having an upper blade guard with a discharge opening. A deflector within the guard directs the sawdust in a direction away from the operator.

U.S. Pat. No. 5,167,215 to Harding discloses a dust removal apparatus featuring a blade guard mounted for rotation on a side of the wheeled housing and a pivotally mounted funnel mounted on the blade guard. The funnel, telescopically mounted on the blade guard, extends between the blade guard and slab being cut. The funnel is provided with a bearing riding in contact with the slab. The funnel is connected to an exhaust duct leading to a vacuum source.

U.S. Pat. No. 5,327,649 to Skinner discloses a portable circular saw with a dust collector including an upper blade guard fixed to the motor and rotatably supporting the rotating blade and a lower blade housing that conforms to the extended cutting edge of the blade but which is hinged and folds back into the upper housing as the blade proceeds through the cut.

The job of cutting plaster board poses special problems that are not addressed by these disclosed examples of the prior art which are directed more toward the sawing of wood nor are they addressed by the "router" type of tool presently used for the purpose.

The plaster board, being made of cast plaster, disintegrates into a fine power when it is sawed so that it is very desirous to use a saw blade that is as thin as practical in order to minimize the amount of kerf that is generated by the cutting action. The reciprocating saw type blade inherently requires that a wide cut be made compared to a rotary saw so that a significantly larger amount of kerf is generated than could be achieved with a rotary blade.

Another problem is that, in carrying out many jobs such as in remodelling in which the board is nailed to a stud, the cutting blade encounters one or more nails such that the ordinary cutting blade such as a rotary blade or reciprocating saw is destroyed or at least degraded by such encounters.

Solution to the problem of a blade with sufficient impact resistance, suggesting the use of a very sturdy blade runs counter to a requirement for a very delicate blade in order to minimize the generation of kerf. A blade addressing both or these problems suggests that protection of the blade be provided at all times regardless of whether the saw is in use, momentarily set aside, or being stored or transported such as in a tool box along with other tools.

Another important consideration is that, often times, it is desirable to maintain a closely controlled depth of cut. This requirement occurs when the plaster board is nailed to a stud on the side of the board that is blind to the worker and his requirement is to cut out a section of board in which an edge of the section to be cut lies along the narrow side of a stud parallel to and spaced between the broad sides of the stud.

The reciprocating saw is not amenable to controlling depth of cut and its use often results in cutting unseen wires and plumbing.

OBJECTS

It is an object of this invention to provide a tool for cutting plaster board in which the tool cuts a very narrow slot in order to minimize the generation of kerf.

It is another object to make feasible use of a high quality blade that can cut through nails and the like without damage to the blade.

In view of the expense of such a a high quality blade, it is a further object to provide a tool in which the tool is protected from damage such as when the saw is stored or laid aside.

It is another object of this invention to supply a hand held power saw in which the dust that is generated be readily removable in accordance with features of the invention.

It is another object to provide a saw in which the depth of cut can be preset to enable making cuts that avoid cutting under supports such as a stud on which the plaster board may be mounted.

Achieving these objects and providing other advantages will become apparent upon reading the description and studying the drawings.

SUMMARY

This invention is directed toward a circular saw mounted on the shaft of a fight angle motor and having a cover into which the saw retracts when not in contact with the panel being cut but which extends out of the hood when the saw is in position for cutting. The hinge attachment of the hood to the motor housing is spring loaded for this purpose. The hood also has an exit that may be covered by either one of two doors according to the choice of the user. One plain door is a flat panel that simply covers the exit and may be snapped on or off when the user desires to empty any kerf that is trapped in the hood. The plain door is convenient when the user has only one cut to be made. The second cover is provided with an open spout to which a vacuum hose leading to a source of vacuum may be attached. This latter arrangement is convenient when the user has many cuts to make and the accumulation of dust is an inconvenience. A screw adjustment threaded into the motor support and abutting the hood may be positioned to provide an adjustable depth of cut for those jobs where the user wishes to cut through a board mounted on the stud but does not wish to cut trough the stud. The saw blade is preferably diamond tipped along its cutting edge so that the saw will cut through any nail that might be in the board.

DRAWINGS

FIG. 2 shows a side view of the saw not extended from the hood.

FIG. 3 shows the saw extended from the hood and cutting plaster board.

FIG. 4 shows a mounting plate with a handle.

FIG. 5 shows another construction of a mounting means.

DESCRIPTION OF A PREFERRED EMBODIMENT

Figure 1:
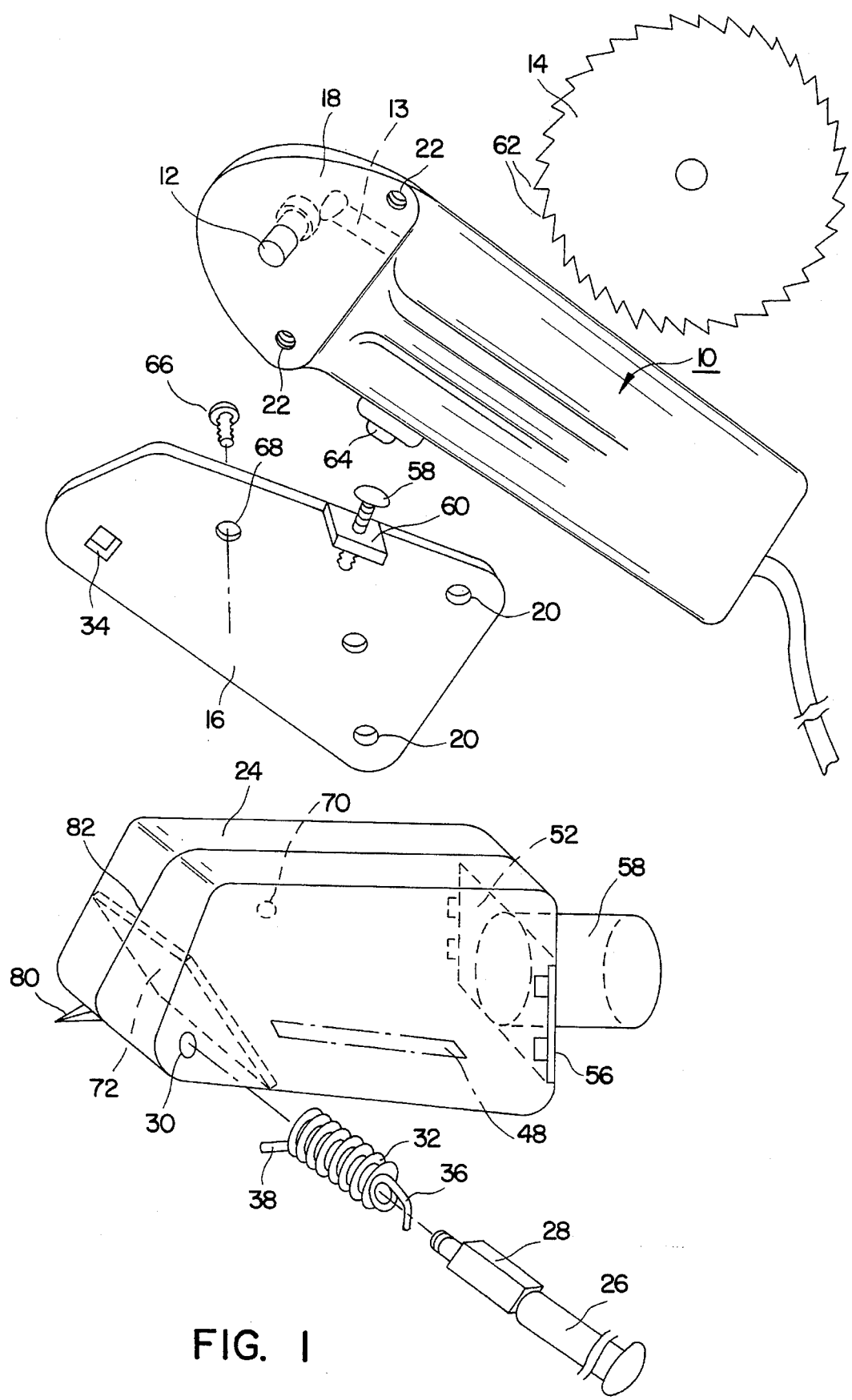
FIG. 1 shows in perspective pans of a preferred embodiment of the invention.

Turning now to a discussion of the drawings, FIG. 1 shows four parts of the saw of this invention. There is shown a motor 10 having a right angle mounting shaft 12 on which a circular saw 14 is rotatably mounted. The mounting shaft 12 is shown perpendicularly coupled to the motor shaft 13 (in phantom. A mounting plate 16 is secured to the face surface 18 of the motor by bolts through holes 20 in the mounting plate 16 and screwed into mounting holes 22 in the face 18 of the motor 10. A hood 24 is rotatably mounted with one side 25 of the hood 24 parallel and proximal to mounting plate 16 and having hole 17 through which mounting shaft 12 extends into the interior of hood 24 such that the saw blade can move into and out of slot 48 as shown in FIG. 2. The hood 24 is rotatably mounted on shaft 26. Shaft 26 passes through hole 30, through spring 32 which is inside the hood 24 then out through another hole in the hood 24 (not shown). The square end 28 of bolt 26 passes through the square aperture of mounting plate 16 and is secured by a nut (not shown), Therefore, shaft 26 will not rotate with hood 24. Spring 32 when inside hood 24 has one end 36 secured to the shaft 26 and another end secured to the hood 24.

FIG. 2 is a side view of the assembled saw showing the lower surface 40 of the hood 24 adjacent to but not pressed against a surface 42 of a board to be cut. Spring 32 (shown in phantom inside the hood in FIG. 2) biases the hood 24 to rotate about shaft 26 so as to cover the saw blade shown in phantom in FIG. 2. When the handle 46 of motor 10 is pressed toward the surface 42 as shown in FIG. 3, the saw blade 14 passes through slot 48 (see FIG. 1 ) and cuts into panel 50. The rear end of the hood 24 has an opening 52 may be covered by either one of two doors as shown in FIG. 2. One door 54 is a plain door which the user snaps onto opening 52 when he wants to make a quick, short cut and doesn't want to have to attach a vacuum the plain door enables the user to easily empty a small amount of kerf accumulated in the hood. The second door 56 is provided with a spout 58 to which a vacuum hose may be attached for those jobs requiring many long cuts and for which the accumulation of kerf becomes a nuisance.

In order to adjust the depth of cut, shown as "D" in FIG. 3, an adjustment bolt 59 is screwed into a lobe 60 on mounting plate 16 and has an end abutting the top surface of the hood 24. A shown in FIG. 3, extension of the saw through slot 48 is determined by setting bolt 58, In order that the saw may cut through nails encountered in cutting installed boards. It is preferred that the tip 62 of the saw blade 14 be coated with diamond.

The "start" button 64 is placed on the barrel of the motor 10 at a location where the use can conveniently turn the motor on while he is gripping the handle of the motor.

When the saw is not being used and is stored for a prolonged period, a locking bolt 66 screwed through a threaded aperture 68 in mounting plate 16 screws into a locking aperture 70 shown in phantom in the rear side of the hood 24 and locks the hood in protective position over the blade.

The foregoing description illustrates features of the invention which satisfy the objects of the invention. A thin diamond tipped blade may be used to cut through nails which, though it is expensive and fragile, the blade is protected when not actually in use and therefore may be stored without much concern such as with other tools in a tool box or it may be laid down without inadvertently bending the blade. The user may use the saw with either a plain door that is opened for removal of small amounts of kerf or a door provided with a spout for attachment to a source of vacuum. Other variations and modifications may be considered which are within the scope of the invention. For example, as shown in FIG. 4, the mounting plate may be provide with a handle 74 that facilitates handling and guiding the saw. The hood may be provided with a partition 72 such as to prevent kerf from clogging the spring 32. The saw may be mounted directly onto a motor shaft with the axis of rotation of the saw parallel to the motor shaft. It will be understood in this case that the mounting shaft is simply an extension of the motor shaft. The means for mounting the hood to the motor may not be a plate but, as shown in FIG. 5, may be simply a convoluted arm 76 having a shape with boltholes 20 for bolting the arm 76 to the motor 10 near one end of the arm 76 and a square hole 34 for receiving the spring shaft 28 on an opposite end. As shown in FIG., 1, a saw guide, being a pointer 80 and/or a guide stripe 82 may be located on the hood to align the saw with the intended line of cut. The spout 58 may be located on the top of the hood or the side of the hood.

In view of these variations, I therefore wish to define the scope of my invention by the appended claims and in view of the specification if need be.

I claim:

1. A tool for collecting dust generated when sawing a board having a board surface using a saw of the type having a motor with a face surface and a mounting shaft extending perpendicularly from said face surface, said mounting shaft being coupled perpendicularly to a motor shaft of said motor with a circular saw blade rotatably mounted on said mounting shaft, said tool comprising:

a mounting plate having holes arranged for bolting said mounting plate to said face surface of said motor with a said mounting plate against said face surface with said mounting shaft extending through one of said holes of said mounting plate;

a hood having a base side with a slot and a first side having an edge joined perpendicularly to said base side along an edge of said base side and a second side having an exit opening adapted for attachment to a means for exhausting kerf from said hood and a plurality of other sides;

said base side, second side and said plurality of sides bounding an interior region within said hood;

said first said having an elongated slot through which said mounting shaft extends into said interior region of said hood and supports said blade in said interior region;

said mounting plate positioned slidably against and rotatably mounted on said first side between a first position with respect to said hood and a second position with respect to said hood;

said first position being when said base side is positioned against said board surface and said circular saw is entirely positioned within said interior region and said interior region communicates only with said means for exhausting; and said second position being wherein an edge of said saw blade extends through said slot and away from said base side whereby kerf generated in said interior region can escape only through said exit opening to said means for exhausting; a spring means for biasing said hood toward said first position.

2. A tool as in claim 1 wherein said mounting plate has means for controlling extension of said saw blade from said base surface out of said hood when said hood is in said second position.

3. A tool as in claim 2 wherein said means for controlling comprises:

a lobe secured to an edge of said mounting plate and extending perpendicularly away from said mounting plate over said hood;

said lobe having a threaded aperture;

a depth adjustment screw threaded into said aperture in said lobe with threaded aperture and depth adjustment screw located such that an end of said depth adjustment screw abuts said hood to prevent further extension of said saw blade beyond said second position when said depth adjustment screw is positioned at a desired position corresponding to said second position.

4. A tool as in claim 1 which comprises means for securing said hood in said first position.

5. A tool as in claim 4 wherein said securing means comprises:

a first locking aperture in said mounting plate aligned with a second locking aperture in said hood when said hood is in said first position;

a bolt inserted through said first and second apertures when said hood is in said first position.

6. A tool as in claim 1 which comprises a handle having one end secured to said mounting plate and extending away from said mounting plate in operable arrangement with said mounting plate and hood to enable a user to grasp said handle and guide said saw.

7. The tool for sawing as in claim 1 which comprises guide means adapted for maintaining alignment of said saw with a guide line.

8. The tool of claim 7 wherein said guide means is a line on a surface of said hood.

9. The guide means of claim 7 wherein said guide means is a pointer on said hood.

* * * * *